May 29, 1956     T. REICHSTEIN     2,748,149
ETIOCHOLANIC ACID DERIVATIVES AND A PROCESS OF MAKING SAME
Filed Sept. 30, 1953
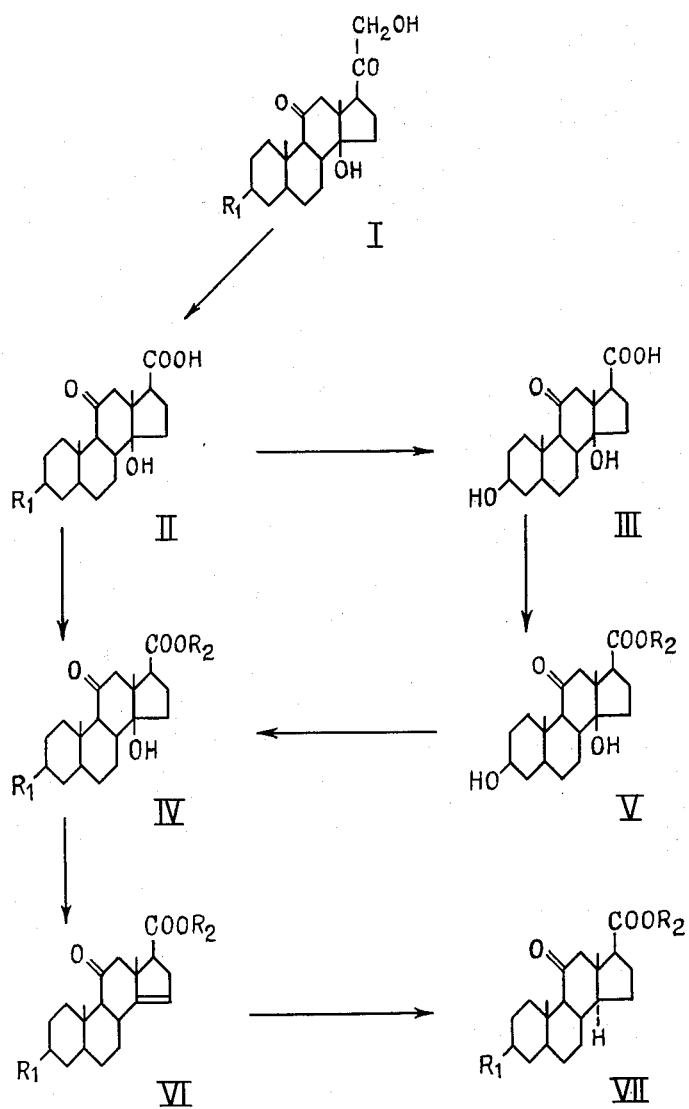
INVENTOR.
TADEUS REICHSTEIN
BY
ATTORNEYS

2,748,149

ETIOCHOLANIC ACID DERIVATIVES AND A PROCESS OF MAKING SAME

Tadeus Reichstein, Basel, Switzerland, assignor to Organon Inc., Orange, N. J., a corporation of New Jersey Application September 30, 1953, Serial No. 383,335

Claims priority, application Netherlands October 4, 1952

1 Claim. (Cl. 260—397.1)

This invention relates to etiocholanic acid derivatives and more particularly to etiocholanic acid derivatives having a keto group in 11-position, and to a process of making such derivatives.

It is one object of this invention to provide new and valuable 3,14-dihydroxy-11-keto etiocholanic acid and derivatives of such acid.

Another object of this invention is to provide new and valuable 3-hydroxy-11-keto-$\Delta^{14,15}$-etiocholenic acid and derivatives of such acid.

Still another object of this invention is to provide a simple and effective process of producing 3,14-dihydroxy-11-keto etiocholanic acid and derivatives of such acid.

A further object of this invention is to provide a simple and effective process of producing 3-hydroxy-11-keto-$\Delta^{14,15}$-etiocholenic acid and derivatives of such acid.

Still another object of this invention is to provide a simple and effective process of producing 3-hydroxy-11-keto-etiocholanic acid and derivatives of such acid.

Other objects of this invention and advantageous features thereof will become apparent as the description proceeds.

In principle, the process of producing 11-keto-etiocholanic acid compounds having a hydroxyl group in 3-position or in 3- and 14-position comprises oxidation of 3,14,21-trihydroxy pregnanedione-(11,20), thereby protecting the 3-hydroxyl group, to the corresponding etiocholanic acid derivative whereby the side-chain in 17-position is converted into the carboxyl group. The resulting 3,14-dihydroxy-11-keto-etiocholanic acid compound wherein the hydroxyl group in 3-position is protected against the action of the reaction agents used in subsequent reaction steps as described hereinafter, is esterified and the corresponding etiocholanic acid ester obtained thereby is subjected to the action of an agent capable of splitting off water between the hydroxyl group in 14-position and the methylene group in 15-position. Thereby a double bond is introduced between the carbon atoms 14 and 15 and the corresponding unsaturated $\Delta^{14,15}$-etiocholenic acid ester is produced. By hydrogenation of said unsaturated acid the double bond is hydrogenated yielding 3-hydroxy-11-keto-etiocholanic acid esters wherein the 3-hydroxyl group is protected by a group convertible, by hydrolysis, into a hydrozyl group.

The starting material, the 3,14,21-trihydroxy pregnanedione-(11,20) wherein the 3-hydroxyl group is protected, for instance, by conversion into the 3-acyloxy group, is obtained, for instance, according to my co-pending patent application entitled New Pregnane Compounds and a Process of Making Same, said application being executed on September 14, 1953. Said application is a continuation-in-part application of my co-pending applications Serial No. 361,310, entitled Process for the Preparation of Derivatives of Sarmentogenine, filed June 12, 1953, and Serial No. 254,880, entitled A Process of Preparing Compounds Having Adreno-Cortical Hormone Activity, filed November 5, 1951. The process of preparing such 3,14,21-trihydroxy pregnanedione-(11,20) compounds consists in principle in opening the lactone ring of 11-dehydrosarmentogenine or an ester thereof, preferably by means of ozone, and saponifying the resulting ozonization product, thereby forming a —CO—CH$_2$—OH side-chain at carbon atom 17. The hydroxyl group in 3-position is then protected against the action of the oxidizing agent used for oxidizing the side-chain in 17-position to the carboxyl group, by conversion into a group which, on hydrolysis, yields the hydroxyl group, such as an ester, ether and the like group.

The attached drawing illustrates the reaction according to the present invention. In the formulas of this drawing R$_1$ indicates a group which, on hydrolysis, yields a hydroxyl group, and especially an acyloxy group, while R$_2$ is an alcohol residue and especially the residue of a lower aliphatic alcohol.

The starting material, for instance, the 3$\beta$-acyloxy-14$\beta$,21-dihydroxy pregnanedione-(11,20) of Formula I is oxidized to the corresponding 3$\beta$-acyloxy-14$\beta$-hydroxy-11-keto etiocholanic acid by means of oxidizing agents as they are conventionally used in oxidizing a side-chain of steroid compounds to a carboxyl group. Especially suitable agents for carrying out such oxidation are, for instance, chromic acid, perchloric acid, periodic acid.

The resulting 3$\beta$-acyloxy-14$\beta$-hydroxy-11-keto etiocholanic acid of Formula II is esterified to the 3$\beta$-acyloxy-14$\beta$-hydroxy-11-keto etiocholanic acid ester of Formula IV. Esterification of the carboxyl group is carried out, for instance, by means of diazomethane, alkanols, diphenyl methanol, triphenyl methanol, benzyl alcohol. Preferably, said esterification is effected in the presence of an esterification catalyst such as sulfuric acid, p. toluenesulfonic acid, hydrochloric acid.

One may, if desired, saponify the 3$\beta$-acyloxy-14$\beta$-hydroxy-11-keto-etiocholanic acid of Formula II to convert the 3-acyloxy group into the free hydroxyl group. Thereby the 3$\beta$-14$\beta$-dihydroxy-11-keto-etiocholanic acid of Formula III is obtained. This acid is converted into the corresponding ester of Formula V by esterification of the carboxyl group. Subsequently the hydroxyl group in 3-position is also converted into a group which, on hydrolysis, yields the hydroxyl group, such as the acyloxy group whereby the same 3-acyloxy-14-hydroxy-11-keto-etiocholanic acid ester of Formula IV is obtained as by direct esterification of the etiocholanic acid of Formula II. Esterification of the hydroxyl group in 3-position is effected, for instance, by means of formic acid, acetic acid anhydride, acetyl chloride, trifluoro acetic acid, propionic acid anhydride, benzoyl chloride, trimethyl acetyl chloride, phenyl propionic acid chloride, chloro formic acid benzyl ester or its methyl or ethyl esters. Other agents conventionally used in steroid chemistry to esterify or protect a hydroxyl group may, of course, also be used. Esterification is preferably carried out in the presence of an acid binding agent such as an organic base and, preferably, a tertiary organic base, as a catalyst.

Splitting off water from Compound IV and forming a double bond between carbon atoms 14 and 15, is carried out according to methods as they are conventionally used in steroid chemistry to effect such dehydrating reaction between a hydroxyl group and a neighboring methylene group. Preferably, phosphorus oxychloride in pyridine is used for carrying out such reaction. Treatment with a mineral acid, such as hydrochloric acid or with salts of carboxylic acids, such as silver acetate and potassium acetate, may also be used for splitting off water and for producing a double bond between the carbon atoms 14 and 15. Said reaction yields the 3-acyloxy-11-keto-$\Delta^{14,15}$-etiocholenic acid ester of Formula VI.

Hydrogenation of the double bond in 14,15-position of Compound VI is preferably effected in the presence of a catalyst, for instance, of a noble metal catalyst, such as platinum and palladium, or of a catalyst of the nickel and iron group. The resulting hydrogenation product, for instance, 3-acyloxy-11-keto-etiocholanic acid ester of Formula VII is an important intermediate product for the preparation of compounds with adreno-cortical hormone activity.

Said compound of Formula VII may be converted into the corresponding 3-acyloxy-21-hydroxy pregnanedione-(11,20) compound by saponification of the ester group in 17-position, converting the resulting etiocholanic acid into the corresponding acid chloride and reacting said acid chloride with diazomethane to yield the corresponding diazoketone which is then decomposed to the corresponding 17-ketol compound disclosed, for instance, in my co-pending application entitled New Pregnane Compounds, and a Process of Making Same, said application being executed on September 14, 1953. Although the process of preparing said 3-acyloxy-21-hydroxy pregnanedione-(11,20) compound illustrated by Formula XI of my above-mentioned co-pending application, when proceeding according to said co-pending application, requires fewer steps than the process according to the present invention via the corresponding etiocholanic acid derivative, said last mentioned procedure according to this invention has the advantage that separation of the reaction products is simpler than when proceeding according to said co-pending application. The yield, in general, it at least the same as obtained according to said co-pending application.

In the known way, via these 3-acyloxy-21-hydroxy pregnanedione-(11,20)-compounds, therapeutically active steroids, such for instance as Corticosterone or Cortisone, can be prepared. Thus dehydrocorticosterone is obtained for instance by saponification, oxidation and acetylation of the hydroxyl group in 21-position and introduction of the double bond in the 4- and 5-position.

The following examples serve to illustrate the invention without, however, limiting the same thereto.

EXAMPLE 1

*3β - acetoxy - 14β - hydroxy - 11 - keto - etiocholanic acid (Formula II)*

169 mg. of 3β-acetoxy-14β,21-dihydroxy pregnanedione-(11,20) of Formula I, obtained in the pure state, for instance, according to Example 10 of my co-pending application entitled New Pregnane Compounds, and a Process of Making Same, said application being executed on September 14, 1953, by partial saponification of 3β,21-diacetoxy-14β-hydroxy pregnanedione-(11,20), are dissolved in 2 cc. of dioxane. A solution of 220 mg. of periodic acid in 0.8 cc. of water is added thereto. The mixture is allowed to stand for 4 hours. As much dioxane as possible is removed by evaporation in a vacuum at 30° C., a small amount of water is added, and evaporation in a vacuum is continued. 140 mg. of 3β-acetoxy-14β-hydroxy-11-keto-etiocholanic acid of Formula II are isolated from the reaction mixture by dissolving said mixture in sodium carbonate solution, extracting non-acid reaction products by means of ether, and acidifying the sodium carbonate solution. The acid is recrystallized from a mixture of ether and petroleum ether. 126 mg. of crystalline acid having a melting point of 222–227° C. are obtained thereby. From the ethereal extract 28 mg. of 3β,21-diacetoxy-14-hydroxy pregnanedione-(11,20) are obtained as by-product.

EXAMPLE 2

*3β - acetoxy - 14β - hydroxy - 11 - keto - etiocholanic acid methyl ester (Formula IV)*

A solution of 126 mg. of crystalline 3β-acetoxy-14β-hydroxy-11-keto-etiocholanic acid obtained according to Example 1 in 5 cc. of a mixture of ether and petroleum ether to which the ether-petroleum ether mother-liquor from the recrystallization of said acid as described in Example 1 is added, is esterified at room temperature by means of 10 cc. of an ethereal diazomethane solution. The reaction product, after evaporation of the solvent in a vacuum is recrystallized from ether-petroleum ether. 103 mg. of crystalline 3β-acetoxy-14β-hydroxy-11-keto-etiocholanic acid methyl ester, melting at 164–166° C. are obtained. The solvent of the mother-liquor is evaporated in vacuo. The residue is dissolved in 3 cc. of petroleum ether and the solution is subjected to a chromatographic treatment over 2 g. of aluminum oxide. On elution of the chromatographic column by means of benzene-petroleum ether (1:4) another 21 mg. of said ester are obtained which also melt at 164–166° C.

The new ester has an optical rotation $[\alpha]_D^{17}$: $+55.8° \pm 2°$ (c: 1.146 in chloroform).

On elementary analysis the following result was obtained: 3.437 mg. of said ester yield, 8.572 mg. of $CO_2$ and 2.616 mg. of $H_2O$.

Calculated for $C_{23}H_{34}O_6$: 67.95% C; 8.43% H. Found: 68.06% C; 8.52% H. Molecular weight: 406.50.

EXAMPLE 3

*3β,14β-dihydroxy-11-keto-etiocholanic acid (Formula III)*

150 mg. of 3β-acetoxy-14β-hydroxy-11-keto etiocholanic acid obtained according to Example 1 are dissolved in 4.5 cc. of methanol. 375 mg. of potassium hydroxide dissolved in 0.4 cc. of water are added thereto. The mixture is allowed to stand at 20° C. for 15 hours, diluted with a small quantity of water, and neutralized by the addition of potassium bicarbonate. Methanol is distilled off in a vacuum. The distillation residue is repeatedly extracted with chloroform. The combined chloroform extracts are washed with a small quantity of water and are dried over sodium sulfate. The chloroform is evaporated in a vacuum. 130 mg. are obtained as a residue. They are recrystallized from acetone-ether and yield colorless, mostly quadrangular platelets of 3β,14β-dihydroxy-11-keto etiocholanic acid of Formula III, having a melting point of 262–266° C. (corr.).

EXAMPLE 4

*3β,14β-dihydroxy-11-keto-etiocholanic acid methyl ester (Formula V)*

A solution of 130 mg. of 3β,14β-dihydroxy-11-keto-etiocholanic acid according to Example 3, in 5 cc. of a mixture of ether and petroleum ether is esterified at room temperature by means of 10 cc. of an ethereal diazomethane solution. The reaction product is worked up and yields, on recrystallization from ether-petroleum ether, 133 mg. of the crystalline methyl ester of 3β,14β-dihydroxy-11-keto-etiocholanic acid, melting at 142–144° C.; $[\alpha]_D^{17}$: $+59.50 \pm 2°$ (in chloroform). Elementary analysis showed that the compound corresponds to the formula $C_{21}H_{32}O_5$.

Calculated: 69.12% C; 8.85% H. Found: 69.30% C; 8.96% H.

Acetylation by means of acetic acid anhydride in the presence of pyridine yields 3β-acetoxy-14β-hydroxy-11-keto-etiocholanic acid methyl ester of Formula IV.

EXAMPLE 5

*3β-acetoxy-11-keto-$\Delta^{14,15}$-etiocholenic acid methyl ester*

169 mg. of 3β-acetoxy-14β-hydroxy-11-keto-etiocholanic methyl ester of Formula IV are heated with 2 cc. of pyridine, 0.02 cc. of water and 0.6 cc. of phosphorus oxychloride at 70° C. for 16 hours. Ice is added to the reaction mixture which is then extracted with ether. The ethereal extract is washed with dilute hydrochloric acid, water, sodium carbonate solution, and again with water, filtered over a small quantity of aluminium oxide, and evaporated to dryness. 153 mg. of a crude product are obtained which, on recrystallization from ether-petroleum ether yield 102 mg. of crystalline 3β-acetoxy-11-keto-Δ$^{14,15}$-etiocholenic acid methyl ester of Formula VI. Said ester melts at 146–151° C. On distillation of the mother-liquor, another 28 mg. of crystals, melting at 145–151° C., are obtained on recrystallisation from ether-petroleum ether. Said crude product, after further recrystallization, yields an ester melting at 152–154° C.; $[\alpha]_D^{18}$: +40.60±2° (c: 1.353 in chloroform).

Elementary analysis gave the following results: 3.584 mg. of said compound yield 9.313 mg. of $CO_2$ and 2.682 mg. of $H_2O$.

Calculated for $C_{23}H_{32}O_5$: 71.10% C; 8.30% H. Found: 70.91% C; 8.37% H. Molecular weight: 388.49.

EXAMPLE 6

*3β-acetoxy-11-keto-etiocholanic acid methyl ester*

58 mg. of 3β-acetoxy-11-keto-Δ$^{14,15}$-etiocholenic acid methyl ester melting at 147–152° C. are dissolved in 4 cc. of glacial acetic acid. 15 mg. of platinum oxide catalyst ($PtO_2.H_2O$) are added thereto and hydrogen is introduced into the solution. 16.5 cc. of hydrogen are absorbed within about 1 hour. The reaction mixture is filtered and washed with chloroform and ether. The filtrate is evaporated to dryness yielding 58 mg. of a crude hydrogenation product. Said crude product is dissolved in 2 cc. of glacial acetic acid. 0.5 cc. of 2% chromic acid solution in glacial acetic acid is added thereto in order to oxidize again a possible reduced 11-keto group and the mixture is allowed to stand for 16 hours. The residue obtained on evaporation to dryness in a vacuum is dissolved in chloroform-ether. The resulting extract is washed successively with dilute hydrochloric acid, dilute sodium carbonate solution and water, and is dried over sodium sulfate. On evaporation to dryness a crude product is obtained which, on recrystallization from ether-petroleum ether yields 59 mg. of a product which after dissolving in 3 cc. of petroleum ether is subjected to chromatographic treatment over 2 g. of aluminum oxide. The fractions which are eluted by means of petroleum-ether/benzene (1:3), pure benzene, and benzene containing 10% of ether, yield, on recrystallization from ether-petroleum ether 37 mg. of 3β-acetoxy-11-keto-etiocholanic acid methyl ester of Formula VII which melt at 129–131° C.

In place of 3β-acetoxy-14β,21-dihydroxy pregnanedione-(11,20) there may be used as starting material equimolecular amounts of other 3β-acyloxy-14β,21-dihydroxy pregnanedione-(11,20) compounds, such as the formyloxy, propionyloxy, butyryloxy, benzoyloxy, trimethylacetoxy, caprylyloxy, caproyloxy, capryloxy, trifluoro acetyloxy, cyclopentano propionyloxy, cyclehexano acetyloxy, carbomethoxy, carbethoxy, carbobenzoxy, and other acyloxy compounds. Especially suitable are the esters with lower aliphatic carboxylic acids and phenyl carboxylic acids.

Oxidation of said starting materials may be carried out in glacial acetic acid by means of chromic acid on standing for a longer period of time.

In place of dioxane other organic solvents which are not affected by the oxidizing agent and which preferably have a low boiling point, may also be used.

In place of diazomethane, other esterification agents may be employed for esterifying the 3,14-dihydroxy-11-keto-etiocholanic acid and its 3-acyloxy derivatives. They may, for instance, be esterified by heating with the corresponding alcohol in the presence of a catalyst, such as sulfuric acid, toluene sulfonic acid, boron trifluoride. As alcohols there may be used the lower alcohols, such as ethanol, propanol, butanol, amyl alcohol, and also benzyl alcohol, diphenyl methanol, triphenyl methanol, and others. It is also possible to react the alkali or silver salts of said etiocholanic acid compounds with lower alkyl halides, such as methyl chloride, ethyl bromide, triphenyl methyl chloride, or with dimethyl sulfate, diethyl sulfate, and others.

Saponification of the 3-acyloxy compound may not only be effected by methanolic potassium hydroxide, but also by aqueous sodium hydroxide or potassium hydroxide solutions, or, although the yield is lower, by acid-catalyzed hydrolysis.

The double bond between carbon atoms 14 and 15 may be introduced by heating the starting material with aqueous sulfuric acid, hydrochloric acid, or phosphoric acid, treating said material with formic acid, oxalic acid, zinc chloride and potassium/bisulfate which serve as dehydrating catalysts. Thionyl chloride and phosphorus pentoxide may also be used in this reaction. The preferred method, however, is the reaction with phosphorus oxychloride in the presence of pyridine.

By allowing the resulting 3β-acetoxy-11-keto-Δ$^{14,15}$-etiocholenic acid methyl ester of Example 5 to stand at room temperature for several hours with methanolic potassium hydroxide solution or by heating said unsaturated compound for a short period of time under reflux with aqueous of alcoholic alkali hydroxide solutions, free 3β-hydroxy-11-keto-Δ$^{14,15}$-etiocholenic acid is obtained. Said acid is transformed into its 3-acyloxy compounds by acylation as described, for instance, in Example 4. Its carboxylic acid esters are obtained, for instance, as described in Example 2 or 4.

Hydrogenation of the Δ$^{14,15}$ double bond may also be effected in the presence of Raney nickel catalysts or of a nickel catalyst precipitated on kieselguhr. Hydrogenation by means of a platinum or palladium catalyst, however, has proved to be especially advantageous.

It is advisable to re-oxidize any partly hydrogenated 11-keto group after hydrogenation whereby other oxidizing agents as chromic acid in glacial acetic acid used in Example 6 can be employed.

Of course, many other changes and variations in the reaction conditions, the reagents used, such as oxidizing agents, esterifying agents, dehydrating agents, hydrogenating agents, the solvents employed, the reaction temperatures and duration, the methods and procedures of working up the reaction products and of separating them from accompanying by-products, the methods and procedures of purifying said products, and the like, may be made by those skilled in the art in accordance with the principles set forth herein and in the claim annexed hereto.

I claim:

In a process of preparing 3β-acetoxy-11-keto-etiocholanic acid methyl ester, the steps comprising dissolving 3β-acetoxy-14β,21-dihydroxy pregnanedione-(11,20) in dioxane, adding thereto a solution of periodic acid in water, allowing the mixture to stand for several hours, esterifying the resulting 3β-acetoxy-14-β-hydroxy-11-keto etiocholanic acid by means of diazomethane, heating the resulting methyl ester in pyridine with phosphorus oxychloride in the presence of water for several hours at about 70° C., extracting the resulting unsaturated acid ester by means of ether from the reaction mixture, dissolving said ester in glacial acetic acid, hydrogenating the solution in the presence of a platinum catalyst, oxidizing the hydrogenation product in glacial acetic acid with chromium trioxide, extracting 3β-acetoxy-11-keto etiocholanic acid methyl ester from the reaction mixture, and purifying said saturated etiocholanic acid ester by chromatographic treatment.

References Cited in the file of this patent

FOREIGN PATENTS 522,870     Great Britain ------------------ 1940

OTHER REFERENCES

Fieser et al.: Natural Products Relating to Phenanthrene, 3rd ed. (1949), page 408.